United States Patent [19]
Glasser et al.

[11] Patent Number: 5,956,715
[45] Date of Patent: Sep. 21, 1999

[54] METHOD AND SYSTEM FOR CONTROLLING USER ACCESS TO A RESOURCE IN A NETWORKED COMPUTING ENVIRONMENT

[75] Inventors: Daniel S. Glasser, Seattle; Ann Elizabeth McCurdy, Bellevue; Robert M. Price, Seattle, all of Wash.

[73] Assignee: Microsoft Corporation, Redmond, Wash.

[21] Appl. No.: 08/710,975

[22] Filed: Sep. 23, 1996

Related U.S. Application Data

[63] Continuation of application No. 08/355,409, Dec. 13, 1994, abandoned.

[51] Int. Cl.$^6$ ................................................. G06F 17/30
[52] U.S. Cl. ................................................. 707/9; 707/103
[58] Field of Search .............................. 395/200.12, 726, 395/188.01, 200.57, 186; 340/825.34; 380/25, 49; 707/9, 103

[56] References Cited

U.S. PATENT DOCUMENTS

| | | | |
|---|---|---|---|
| 5,048,085 | 9/1991 | Abraham et al. | 380/23 |
| 5,129,083 | 7/1992 | Cutler et al. | 707/103 |
| 5,136,712 | 8/1992 | Perazzoli et al. | 395/600 |
| 5,173,939 | 12/1992 | Abadi et al. | 380/25 |
| 5,220,657 | 6/1993 | Bly et al. | 395/479 |
| 5,237,679 | 8/1993 | Wang et al. | 395/600 |
| 5,263,158 | 11/1993 | Janis | 395/600 |
| 5,315,657 | 5/1994 | Abadi et al. | 380/25 |
| 5,335,346 | 8/1994 | Fabbio | 395/600 |
| 5,388,196 | 2/1995 | Pajak et al. | 395/153 |
| 5,410,705 | 4/1995 | Jones et al. | 395/700 |
| 5,450,593 | 9/1995 | Howell et al. | 395/650 |
| 5,459,863 | 10/1995 | Taylor | 395/600 |
| 5,463,774 | 10/1995 | Jenness | 395/600 |
| 5,469,576 | 11/1995 | Dauerer et al. | 395/186 |
| 5,495,533 | 2/1996 | Linehan et al. | 380/21 |
| 5,615,400 | 3/1997 | Cowsar et al. | 395/685 |
| 5,778,222 | 7/1998 | Herrick et al. | 707/9 |

OTHER PUBLICATIONS

Windows NT Resource Guide 1993 pp. 31–63.
APS Student Manual, May 7, 1991 p. 7–6.
Artificial Intelligence, George F. Lugea & William A. Stubblefield 1993, 386–393, 617–636, 665–667.
Microsoft Corporation, *Microsoft LAN Manager Administrator's Guide*, V. 2.0, 1990, pp. 116–119, 147–150, 153–158.

*Primary Examiner*—Ayaz R. Sheikh
*Assistant Examiner*—Paul R. Myers
*Attorney, Agent, or Firm*—Seed and Berry LLP

[57] ABSTRACT

A unified and straightforward approach to managing file and other resource security in a networked computing environment is disclosed. The invention can be implemented in a multi-user computer network that includes a client computer, a server computer that controls a resource sharable among users of the network, such as a shared file folder or directory, and a communications pathway between the client computer and the server computer. The resource is organized as a hierarchy of elements with a root element at the top of the hierarchy and additional elements below the root element. According to the invention, a request is received to change a protection, such as an access permission, of an element of the resource hierarchy (other than the root) with respect to a particular network user. If the element in question lacks an associated access control list, a nearest ancestor element of the hierarchy is located that has an associated access control list. The first (descendant) element inherits the access control list of the second (ancestor) element. This inheritance is done by generating a copy of the access control list of the second element and associating the generated copy with the first element. The requested change in protection is then incorporated into the generated copy that has been associated with the first element so as to establish an updated access control list for the first element. Further, the requested change can be propagated downwards in the hierarchy from the first element to its descendants having access control lists.

35 Claims, 12 Drawing Sheets

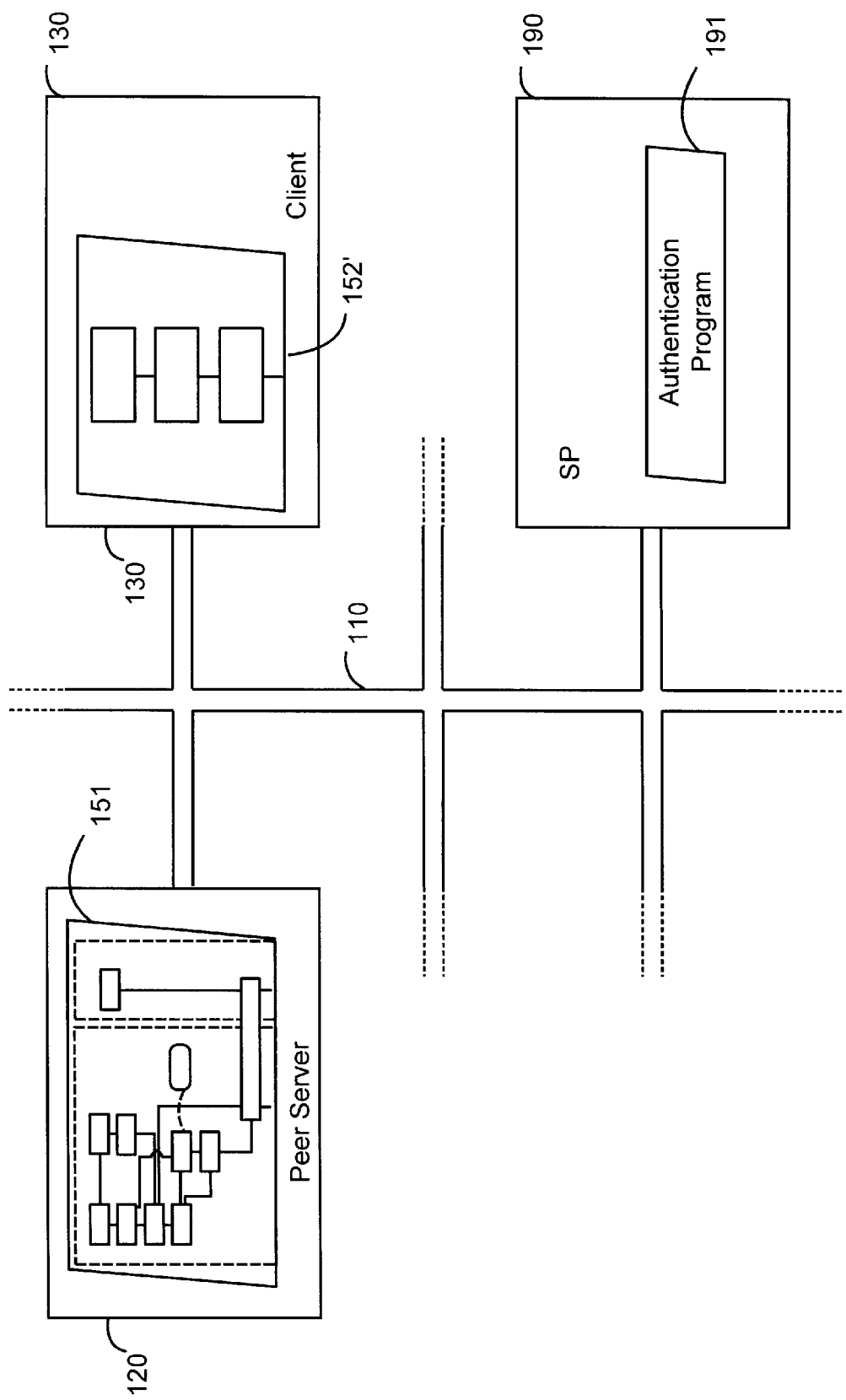

METHOD AND SYSTEM FOR CONTROLLING USER ACCESS TO A RESOURCE IN A NETWORKED COMPUTING ENVIRONMENT

CROSS-REFERENCE TO RELATED APPLICATION

This application is a file wrapper continuation of U.S. patent application Ser. No. 08/355,409, filed Dec. 13, 1994, now abandoned.

TECHNICAL FIELD

The present invention relates to computer networks and more particularly to the control of access permissions for resources such as files and folders (or directories) in client-server computer networks.

BACKGROUND OF THE INVENTION

A computer network links together two or more computers by a communication pathway or pathways, allowing the computers to share resources and information. Networks are fast becoming a standard feature of the modern workplace. Local-area networks of personal computers and workstations are practically a necessity in large offices where many individuals must share and exchange computerized information on a daily basis. Wide-area networks connect users and computers at distant locations across the country and around the world.

In a network, a server computer is one that provides a resource to a client computer. The same computer can be client in one context and server in another. For example, suppose that computer A has a large hard disk for storing files for an entire office, but lacks its own printer. Elsewhere on the office network, computer B has a printer but no hard disk. If a user of computer B wishes to access a file stored remotely on the disk of computer A, then computer B is the client and computer A is the (file) server. If a user of computer A wishes to print a locally stored file using the printer of computer B, then computer A becomes the client and computer B is the (print) server. A computer that can act as both client and server according to the context is called a peer server.

Resource sharing implies issues of resource security. In general, the user of a client computer cannot be trusted with unlimited access to all server resources. Accordingly, the user is required to supply a password in order to log onto the network. Additional mechanisms are used to limit access to particular resources. One such mechanism is a simple share/no-share switch, which can be set either to allow remote access to a given resource from client computers or to restrict remote access so that the resource can be accessed only locally from the server computer. More sophisticated mechanisms used to limit access to particular resources include access control lists, which specify the privileges of particular users with respect to particular resources or collections of resources.

Unfortunately, known operating systems for networking personal computers and workstations, such as Microsoft® Windows™ NT by Microsoft Corp. (Redmond, Wash.), employ resource security models that are complex and difficult for users, especially new users, to understand. Compounding the difficulty are highly nonintuitive user interfaces that frustrate users' attempts to understand the security models and to manipulate resource protections within the models, for example, to manipulate user access permissions for file folders or directories stored in a persistent information store such as a hard disk.

SUMMARY OF THE INVENTION

The system and method of the invention provide a unified and straightforward approach to managing file and other resource security in a networked computing environment. In one aspect, the invention is embodied in a multi-user computer network that includes a client computer, a server computer that controls a resource sharable among users of the network, such as a shared file folder or directory, and a communications pathway between the client computer and the server computer. The resource is organized as a hierarchy of elements with a root element at the top of the hierarchy and additional elements below the root element. According to the invention, a request is received to change a protection, such as an access permission, of an element of the resource hierarchy (other than the root) with respect to a particular network user. If the element in question lacks an associated access control list, a nearest ancestor element of the hierarchy is located that has an associated access control list. The first (descendant) element inherits the access control list of the second (ancestor) element. This inheritance is done by generating a copy of the access control list of the second element and associating the generated copy with the first element. The requested change in protection is then incorporated into the generated copy that has been associated with the first element so as to establish an updated access control list for the first element. Further, the requested change can be propagated downwards in the hierarchy from the first element to its descendants having access control lists.

The invention will be better understood with reference to the drawings and detailed description below. In the drawings, like reference numerals indicate like components.

BRIEF DESCRIPTION OF THE DRAWINGS

FIG. 3 illustrates an example of software components of different network nodes;

DETAILED DESCRIPTION

Overview

The invention provides a method and system for establishing or manipulating access controls for particular network resources, such as files and file folders or directories in a hierarchical file storage system associated with a server computer. In a specific embodiment, the invention supports both explicit access controls associated with a node of a file system hierarchy, and implicit access controls inherited from ancestor nodes of the hierarchy and propagated to descendant nodes in the hierarchy. Put differently, if the file system hierarchy is imagined as a tree structure, the invention concerns how changes made to access restrictions at one point in the tree affect and are affected by access restrictions elsewhere in the tree. Further, the invention provides a streamlined user interface that insulates the user from the complexities involved in making these changes. In particular, the invention performs access control inheritance automatically. The user need not be concerned with distinctions between explicit and implicit access controls or the intricacies of the inheritance and propagation logic. Instead, the user perceives a unified, seamless interface.

System Components

Figure 1:
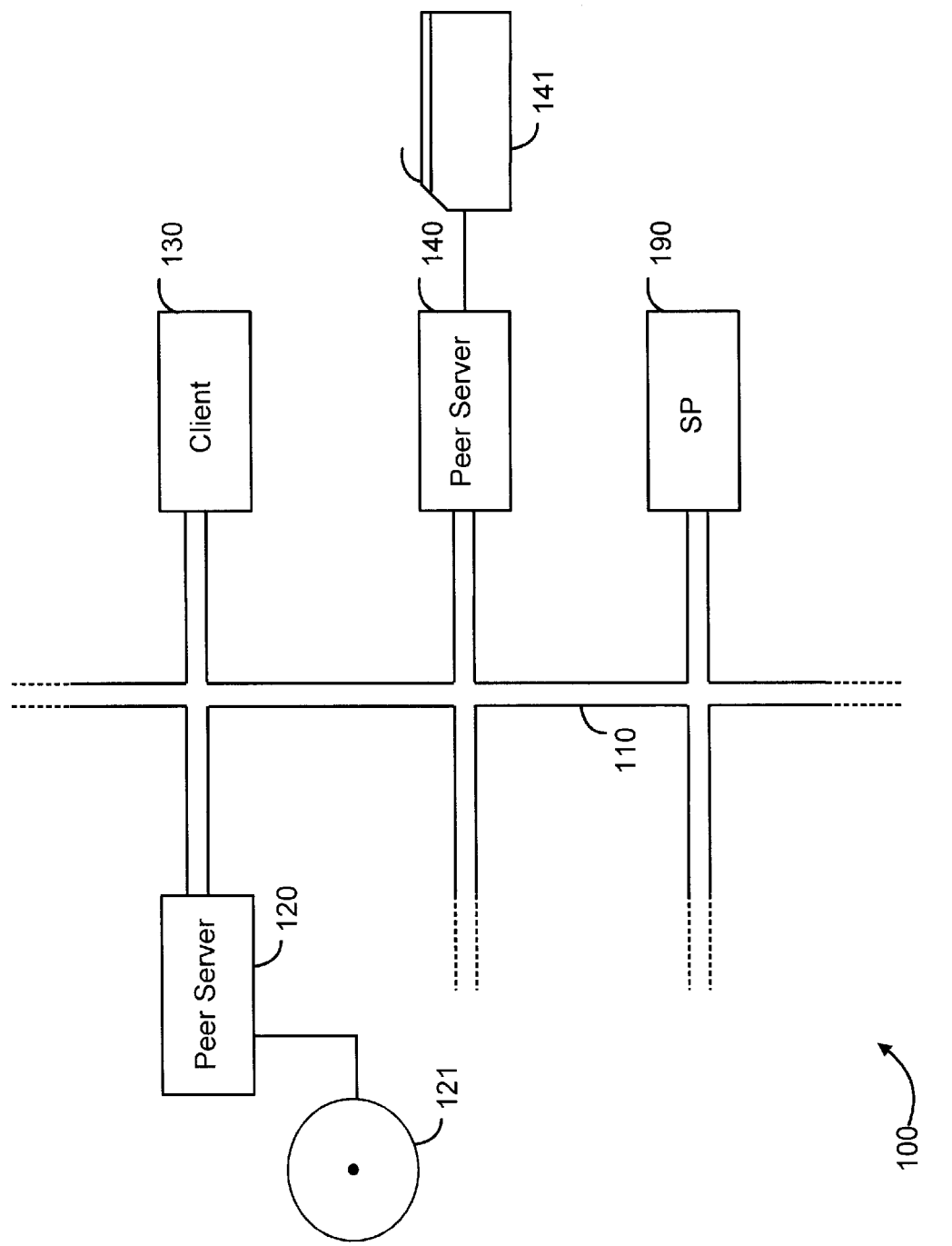
FIG. 1 is a multi-user network system suitable for providing a shared resource according to the invention.

FIG. 1 provides an overview of the system of the invention in a specific embodiment. System 100 includes a network 110 that links multiple computing nodes. Among the nodes of network 110 are peer server 120, which controls persistent storage medium 121; client 130; peer server 140, which controls printer 141; and security provider 190, which acts as an authentication server for the network. Peer server 120, client 130, peer server 140 and security provider 190 all are computers, such as personal computers or workstations. Network 110 can be, for example, a local-area network. Persistent storage medium 121 can include any persistent storage device suitable for reading and writing computer files and organized structures of computer files, such as a magnetic hard disk or writeable optical disk. In the specific embodiment to be described, persistent storage medium 121 is assumed to be a magnetic hard disk, and will hereinafter be referred to as hard disk 121. Printer 141 can be a laser printer, ink-jet printer, or other device for producing hard copy output of computer files. Security provider 190 includes hardware and software used to provide pass-through authentication of users of system 100. In particular, security provider 190 has access to a database of valid users, so that system 100 can screen out users who lack authorization to use the system. Network 110 can include additional computing nodes and support additional file storage, printing, modem, and other resources (not shown).

Figure 2A:
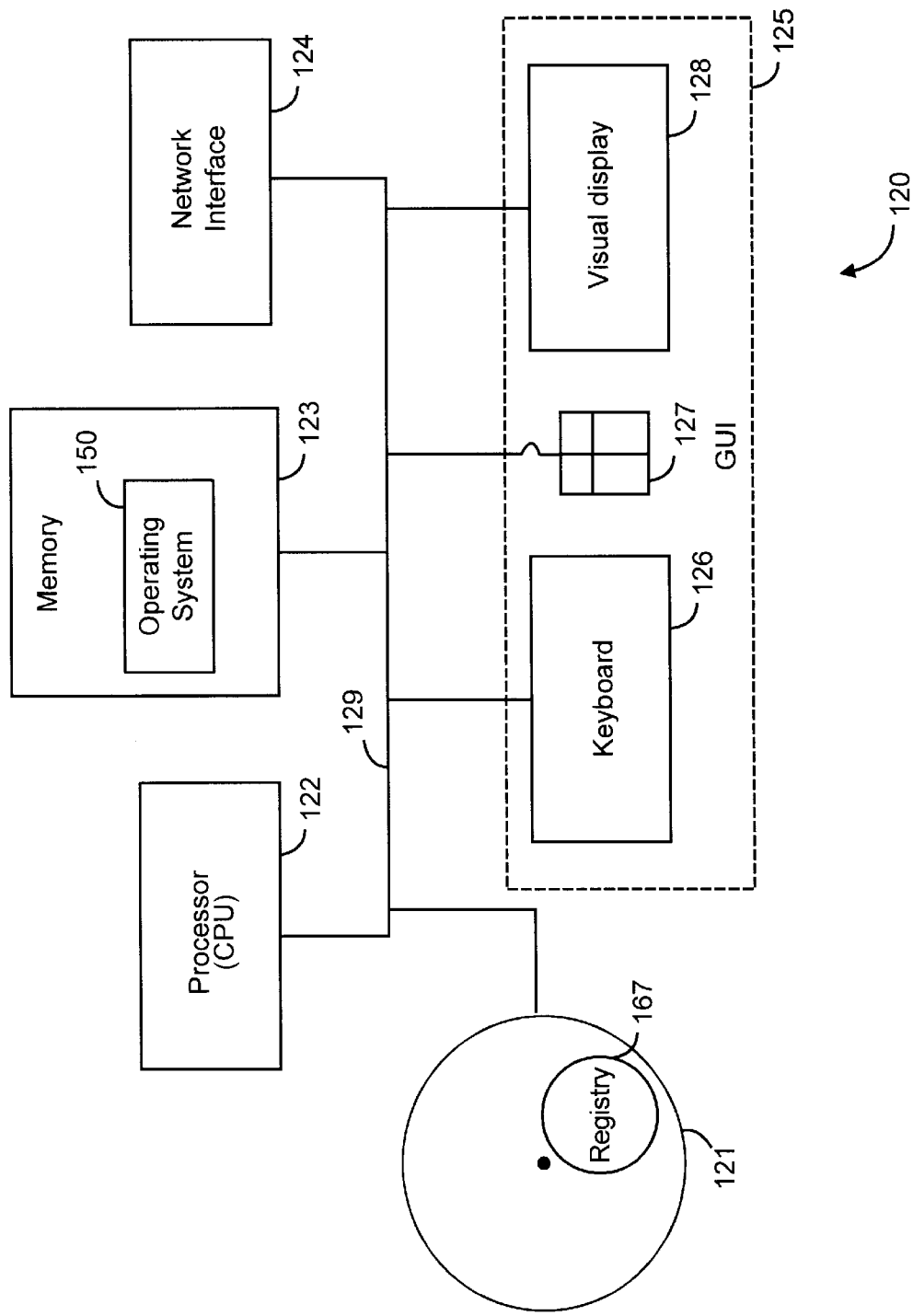
FIG. 2A illustrates the components of a peer server node.
Figure 2B:
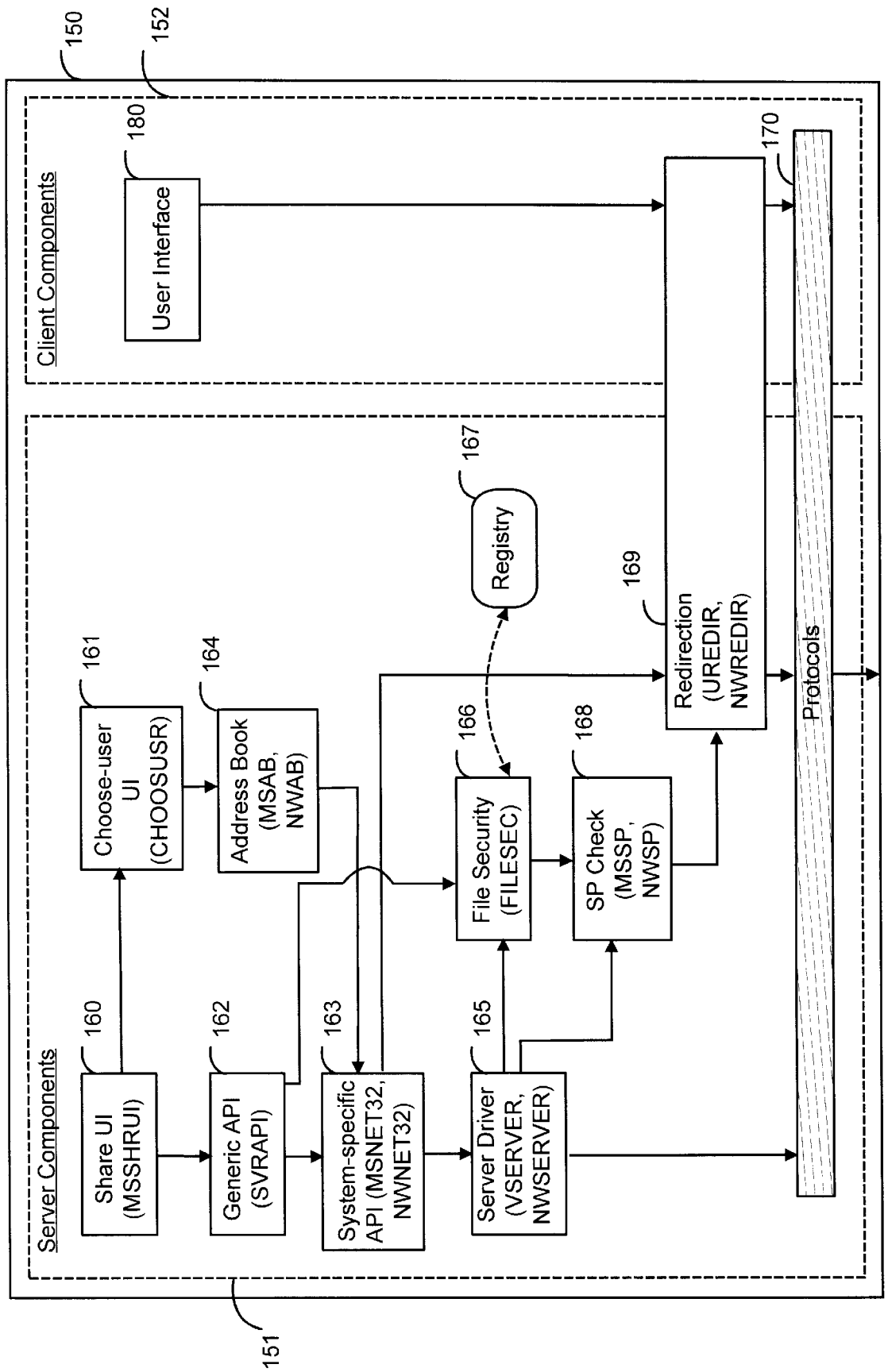
FIG. 2B illustrates client and server software components of a peer server node.

FIG. 1 shows system 100 at the network level. FIGS. 2A–2B provide more detailed views of a node in the network, in particular, of peer server 120.

FIG. 2A illustrates the hardware, operating system, and registry of peer server 120. The hardware includes hard disk 121, a processor (CPU) 122, a memory 123, a network interface 124, and hardware for a graphical user interface (GUI) 125, coupled by a local bus or interface 129. Hard disk 121 can be closely coupled to processor 122, for example mounted in the same chassis as processor 122, or can be an external or outboard unit. Network interface 124 connects peer server 120 with network 110. GUI 125 includes a keyboard 126 and a pointing device 127 from which peer server 120 can receive inputs, and a visual display 128 through which peer server 120 can deliver graphical and textual output. Peer server 120 can further include additional hardware and software (not shown).

Processor 122 can be, for example, a microprocessor, such as the 80386, 80486 or Pentium™ microprocessor, made by Intel Corp. (Santa Clara, Calif.). Memory 123 can include, for example, random-access memory (RAM), read-only memory (ROM), virtual memory, or any other working storage medium or media accessible by processor 122. GUI 125 facilitates communications between a user and peer server 120, and in particular provides a mechanism for a user to manipulate files and file structures and user access permissions associated therewith. Keyboard 126 is a computer keyboard that includes alphanumeric keys for entering text such as file names and system commands. Pointing device 127 can be, for example, a device such as a mouse, a trackball, a stylus, the user's finger, or any other two- or three-dimensional pointing device. Visual display 128 can include, for example, a cathode-ray tube (CRT) or flat-panel display. Persons of skill in the art will appreciate that a wide range of hardware configurations can support the system and method of the present invention in various specific embodiments.

Operating system 150 governs the execution of tasks and the run-time allocation of resources in peer server 120, and includes software which can be loaded from hard disk 121 or other persistent storage into memory 123 and executed by processor 122 as will be understood by those of skill in the art. In the specific embodiment, operating system 150 is the Microsoft® Windows™ 95 operating system f eor IBM PC and compatible computers having or emulating Intel 80386, 80486, or Pentium™ processors. (The invention is also adaptable to other computers and operating systems.) Windows™ 95 supports a hierarchical file system having files and folders. Files can store data, programs, and other computer information, and can be manipulated as objects using the graphical user interface functionality provided by Windows™ 95. Folders, sometimes referred to as "directories," are used to collect related files together and thus provide a convenient way for users to organize their information.

Windows™ 95 provides file system security on a per-folder and per-user basis. Access permissions can be determined with respect to a given network user for all files in a given folder. Also, the permissions assigned to the folders at a given point in the file system hierarchy can, but need not, be applied to folders at points lower in the file system hierarchy.

Access permissions in Windows™ 95 can include, for example, permissions to read files in a folder, write files in a folder, create files and folders, delete files in a folder, change the attributes of files in a folder (such as the file's read-only flag or the most recent modification date of the file), list the names of files in a folder, and remotely change access permissions of a folder. Access permissions affect remote but not local users. For example, a given user logged into system 100 at peer server 120 can access all the files of peer server 120 stored on hard disk 121, even though the same user lacks permission to access those files remotely from client 130. In particular, the user can always change the access permissions of a folder locally, even though most users (other than system administrators with special access privileges) lack the ability to change permissions remotely.

Registry 167 is a configuration database used by operating system 150 to maintain various kinds of system information. In particular, file security component 166 of operating system 150 (see FIG. 2B below) uses registry 167 to store access permissions (access control lists) for resources of peer server 120, such as file folders, that are to be shared with other nodes of network 110. Registry 167 can be stored as shown on hard disk 121. Additionally, portions of registry 167 can be cached in memory 123 for efficient access by processor 122.

Because peer server 120 can act variously as either a client or a server, its operating system 150 incorporates server components 151 and client components 152. These software components support the networking capabilities of peer server 120 and more particularly support manipulation, inheritance, and propagation of resource protections according to the invention.

FIG. 2B illustrates the client and server software of peer server 120. This software is part of operating system 150. It is used in particular for manipulating user access permissions of folders or directories of files stored on hard disk 121. The individual server components 151 will be described in greater detail momentarily. The individual client components 152 include, in particular, a user interface component 180, which is used in accessing a file or folder on hard disk 121 remotely from another node of network 110. Certain components, in particular components 169 and 170, are considered to be both client and server components because they are used by peer server 120 in both its client and its server capacities. Component 169 is a redirector used in formatting network messages sent and received across network 110. Component 170 supports low-level protocols that processor 122 uses in driving network interface hardware 124 when communicating across network 110.

The individual server components 151 will now be described. Component 160 (named MSSHRUI) controls the user interface for establishing and changing access permissions for file folders. Component 161 (CHOOSUSR) controls the aspects of the user interface involved in choosing which users will have access to a folder by adding and removing users from a display list. Component 162 (SVRAPI) is a generic application program interface (API) that is used regardless of the particular networking system being used and the particular protocols and security or permissions model of that system. Component 163 (MSNET32, NWNET32) is an application program interface specific to a particular networking system. For example, the MSNET32 software of component 163 is used in conjunction with Microsoft® Windows™ NT networking, and the NWNET32 software of component 163 is used in conjunction with the NetWare® networking system by Novell, Inc. Provo, Utah). The system-specific application program interface provided by component 163 provides compatibility with pre-existing networks, for example, networks based on Windows™ NT or NetWare® protocols. The generic API of component 162 can automatically select the proper protocol from among the available network protocols supported by component 163. Component 164 (MSAB, NWAB) accesses an address book of users that can be provided to other server components in a format specific to the particular networking system and protocols being used.

Component 165 (VSERVER, NWSERVER) is the principal component used to receive and transmit messages across network 110. Component 166 (FILESEC) checks file folder access permissions. Component 168 (MSSP, NWSP) checks user validity by communicating with security provider 190. In particular, component 168 can obtain from security provider 190 a list of user groups (collections of users all of whom are subject to the same access permissions with respect to a particular resource or resources) and store this list locally on hard disk 121. Like components 163 and 164, components 165 and 168, as well as redirector component 169 (VREDIR, NWREDIR), can provide software to support two or more different networking systems and their respective protocols and security models.

Registry 167, which was previously described with reference to FIG. 2A, is used by file security component 166 to store access permissions. Because registry 167 is not executable software, it is not, strictly speaking, a part of operating system 150. It is included in FIG. 2B to illustrate its relationship to file security component 166 according to the invention in this embodiment.

Other nodes of network 110 of system 100 will now be described. The hardware of client 130 and peer server 140 is similar to the hardware of peer server 120 described with reference to FIG. 2A. However, client 130 differs from peer server 120 in that it can, for example, lack a hard disk analogous to hard disk 121 and lack other shareable resources that would make it suitable for use as a peer server. (Alternatively or additionally, client 130 can be unsuitable for use as a peer server because it has a relatively slow CPU or relatively little memory, or is otherwise unsuitable for managing a significant volume of resource requests from other nodes of network 110.) Client 130 can include a floppy disk drive or other persistent storage device not well-suited for file sharing across a network. Peer server 140 differs from peer server 120 in that it has a printer (specifically, printer 141); it can have a hard disk analogous to hard disk 121 or other persistent storage.

The operating system of client 130 is similar to a subset of the operating system 150 of peer server 120 previously described with reference to FIG. 2B. The operating system software of client 130 can be used to control its local resources including, for example, a floppy disk drive. Because client 130 does not act as a server in this embodiment, its operating system software includes client components but need not include server components. The client components of client 130 are analogous to client components 152 of operating system 150 in peer server 120. Client 130 can maintain a registry to store its system information, but because client 130 does not share resources across the network, its registry need not contain access permissions.

The software of peer server 140 is similar to the software of peer server 120 described with reference to FIG. 2B. It includes operating system software, analogous to operating system 150, that can be used to control its local and shareable resources including printer 141. Because peer server 140 can act variously as either a client or a server, its operating system software includes both client and server components. These components are analogous, respectively, to server components 151 and client components 152 of peer server 120. Also, peer server 140 maintains in its persistent storage a registry analogous to registry 167 for storing user access permissions for printer 141.

FIG. 3 shows an example of software components in use on different nodes of network 110. Peer server 120, which controls hard disk 121, executes server components 151 while client 130 executes client components 152'. Security provider 190 is also shown executing authentication software 191.

Figure 4:
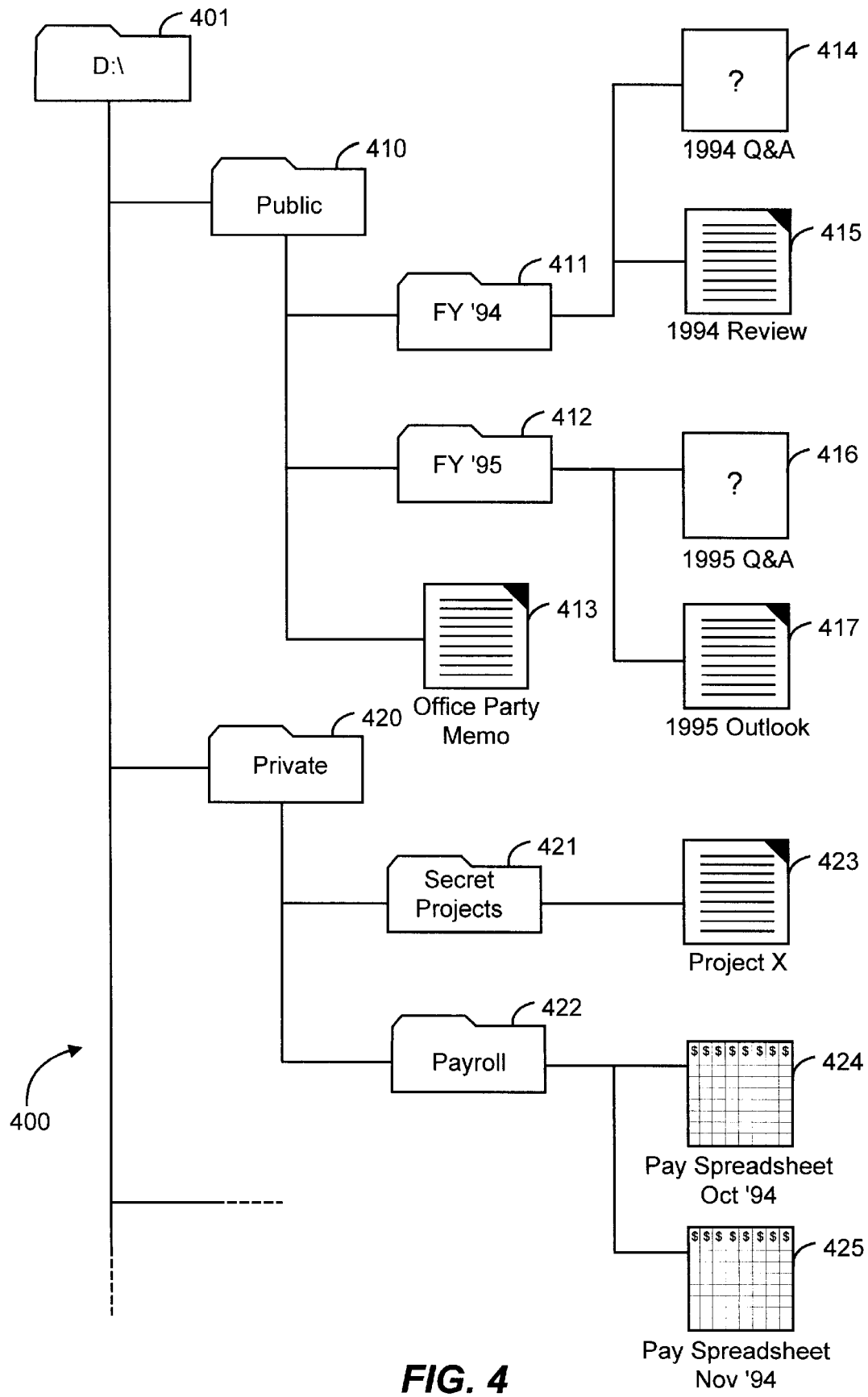
FIG. 4 is an example of a file system hierarchy having folders for which access permissions can be set.

FIG. 4 provides a concrete example of a file system hierarchy 400 having folders whose access permissions can be set. The folders and files of hierarchy 400 are stored on hard disk 121 in this embodiment. Folder 401 is the root of the hierarchy for device D:\, which is hard disk 121. Folder 401 contains folders including a folder 410 named "Public" and a folder 420 named "Private," and can contain additional files and folders (not shown). Folder 410, in turn, contains folder 411 ("FY '94") and folder 412 ("FY '95") and a file 413 ("Office Party Memo"). Folder 411 contains file 414 ("1994 Q&A") and file 415 ("1994 Review"). Folder 412 contains file 416 ("1995 Q&A") and file 417 ("1995 Outlook"). Folder 420 ("Private") contains folder 421

("Secret Projects") which contains file 423 ("Project X"), and further contains folder 422 ("Payroll") which contains file 424 ("Pay Spreadsheet Oct '94") and file 425 ("Pay Spreadsheet Nov '94").

Each folder of hierarchy 400 can, but need not, have an associated permissions list called an access control list (ACL). An ACL for a given folder contains a list of users (and user groups) and their respective access permissions for that folder. The folder's ACL is checked each time that any remote user attempts to access the folder or its contents. ACLs are stored in registry 167 and are managed by file security component 166.

A folder's access permissions can be inherited by its descendants in hierarchy 400. For example, if folder 420 has an ACL that denies all access permissions to a given user, and folders 421 and 422 lack ACLs of their own, then folders 421 and 422 inherit the permissions of the parent folder 420 and so cannot be accessed by that user. As another example, if folder 401 has an ACL that provides read access for a given user, folder 410 lacks an ACL, folder 411 lacks an ACL, and folder 412 has its own ACL, then folders 410 and 411 inherit the permissions of their ancestor folder 401 with respect to that user, but folder 412 uses its own ACL. Thus the ACL of folder 412 overrides the ACL that would otherwise be inherited from folder 401 in this example. (The root folder 401 has no ancestors and therefore does not inherit in this embodiment.)

In this embodiment, inheritance does not proceed beyond the nearest ancestor having an ACL. For example, if folder 411 has no ACL of its own and folders 401 and 410 each have an ACL, folder 411 inherits its ACL from folder 410 but not from folder 401. Thus if the ACL of folder 410 lacks an entry for a particular user, no attempt is made to determine whether that user is listed in the ACL of folder 401 when checking the user's access permissions for folder 411. Similarly, if folder 412 has an ACL and the ACL lacks an entry for a particular user, that user is denied access to folder 412, regardless of the contents of any ACLs that may be associated with ancestor folders 410 and 401.

Method Steps

Figure 5:
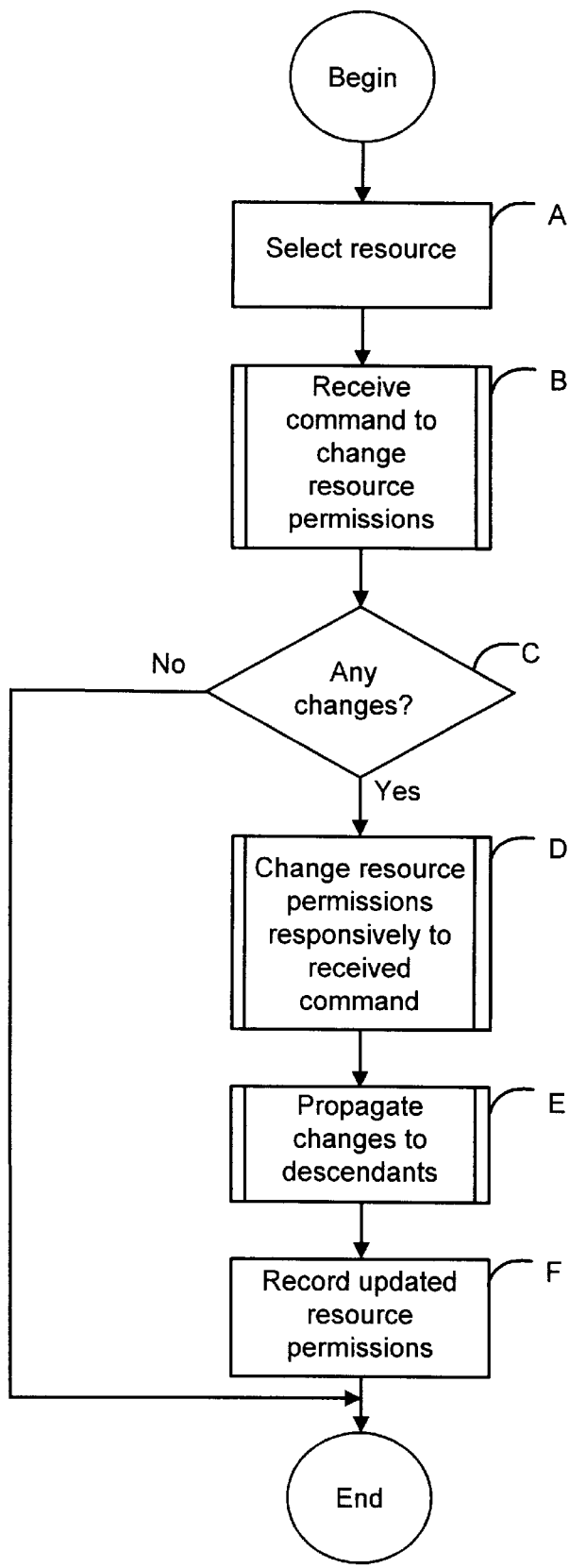
FIG. 5 is a high-level flowchart of the steps of setting access permissions for a shareable resource.

FIG. 5 is a high-level flowchart of the steps of setting access permissions of a shareable resource of peer server 120. The shareable resource is stored on hard disk 121 and is part of a resource hierarchy. For concreteness the resource is assumed to be a folder of hierarchy 400, for example folder 410. Commands for manipulating resource access permissions are assumed to be received from user interface 125 of peer server 120. It will be appreciated that the commands could also come from other sources, such as a script file executed by processor 122 or, in some circumstances, from another node of network 110, for example client 130, if the user of the remote node (e.g., a system administrator) has the necessary permissions to change permissions remotely.

Initially, the resource for which permissions are to be established or modified is selected (step A). Peer server 120 receives a command to change the permissions for the selected resource (step B). If the command is null, so that there are no changes to be made (step C), the remaining steps of FIG. 5 are skipped. Otherwise, peer server 120 alters the resource access permissions responsively to the received command (step D), propagates changes to the descendants of the resource in the hierarchy (step E), and records the updated permissions in registry 167 (step F).

Figure 6A:
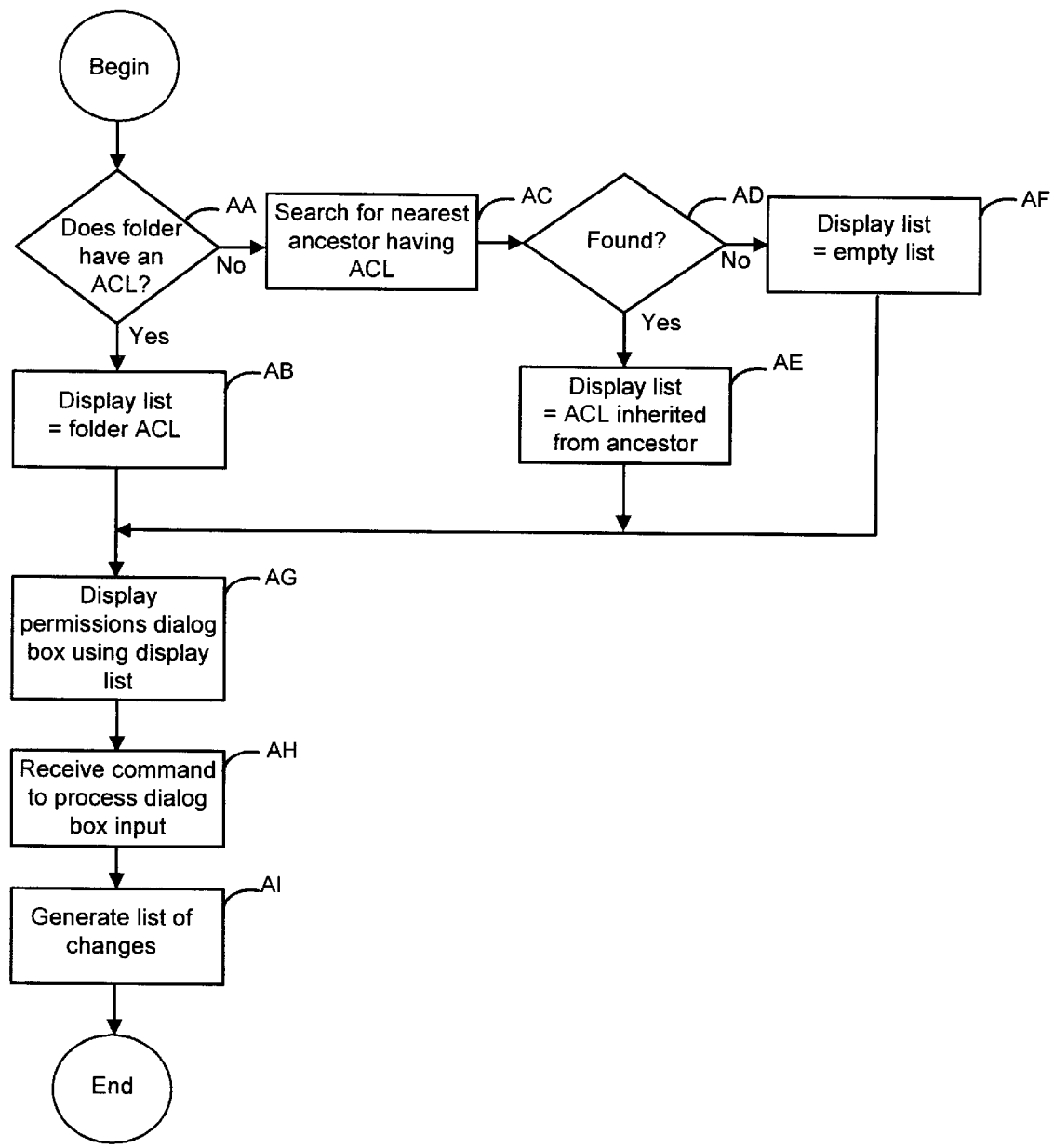
FIG. 6A is a more detailed flowchart of the steps for receiving from a user interface a command to change resource access permissions.

FIG. 6A illustrates step B of FIG. 5 in more detail. Initially, peer server 120 determines whether the selected folder has its own ACL (step AA). If so, the display list that will be presented in user interface 125 and used to set the updated access permissions is simply the folder's ACL (step AB). If not, peer server 120 determines the nearest ancestor having an ACL by searching upwards in the resource hierarchy (step AC) until a folder having an ACL is found or the root of the hierarchy is reached (step AD). If a nearest ancestor having an ACL is found, the display list is the ACL of the ancestor (step AE); otherwise, it is the empty list (step AF).

Figure 6B:
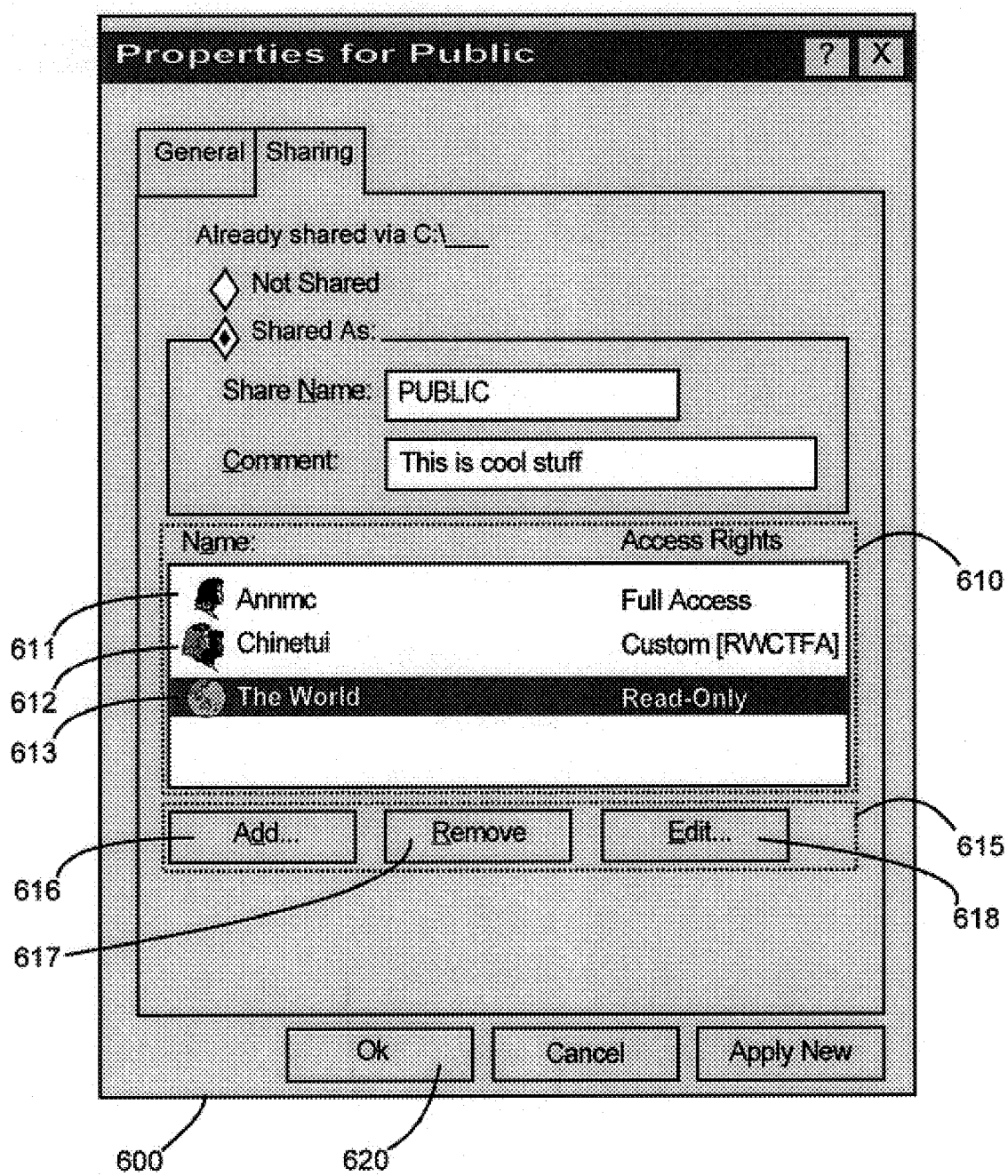
FIG. 6B is an example of a user interface dialog box for changing access permissions for a selected folder of a file system hierarchy.

Once the display list is determined, peer server 120 displays in user interface 125 a dialog box that can be used to set permissions for the selected folder (step AG). FIG. 6B illustrates an example of a dialog box 600 suitable for changing the permissions of the folder whose name is "Public," that is, folder 410. Dialog box 600 includes a display list 610 that contains names of user 611 and user groups 612 and 613. A user group identifies a collection of users all of whom are subject to the same access permissions with respect to a particular resource or resources. Associated with each listed user or user group are the access permissions for that user or group. In the example, user 611 ("Annmc") has full access to folder 410. Members of user group 612 ("Chinetui") have limited access to folder 410, with particular access permissions (read, write, create, delete, etc.) specified individually. Members of user group 613 ("The World") have read-only access to folder 410.

Dialog box 600 also includes control buttons 615 which, when selected with pointing device 127, cause additional dialog boxes (not shown) to be displayed for use in changing access permissions for the selected resource. Button 616 (labeled "Add") allows a user not in display list 610 to be added to the set of users who can access folder 410. Button 617 ("Remove") allows a user in display list 610 to be removed from the set of users who can access folder 410. Button 618 ("Edit") allows the access permissions for a user in display list 610 to be altered. Dialog box 600 further includes a command button 620 ("OK") that, when selected, issues a command that causes peer server 120 to process all changes made in dialog box 600.

According to the invention, the user cannot tell from looking at dialog box 600 whether folder 410 has its own ACL or inherits the ACL of an ancestor. The user sees the same interface either way and is insulated from the details of inheritance, which happens automatically "behind the scenes." Thus the invention provides an easy to-use, intuitive interface for setting access permissions.

Returning to FIG. 6A, when the command button 620 is selected, peer server 120 receives a command to process the input from dialog box 600, that is, the changes made to the display list users and their associated permissions with respect to the selected resource. Peer server 120 generates a list of changes (step AI). This is the list of changes that is tested in step C to determine whether anything further needs to be done.

Figure 7:
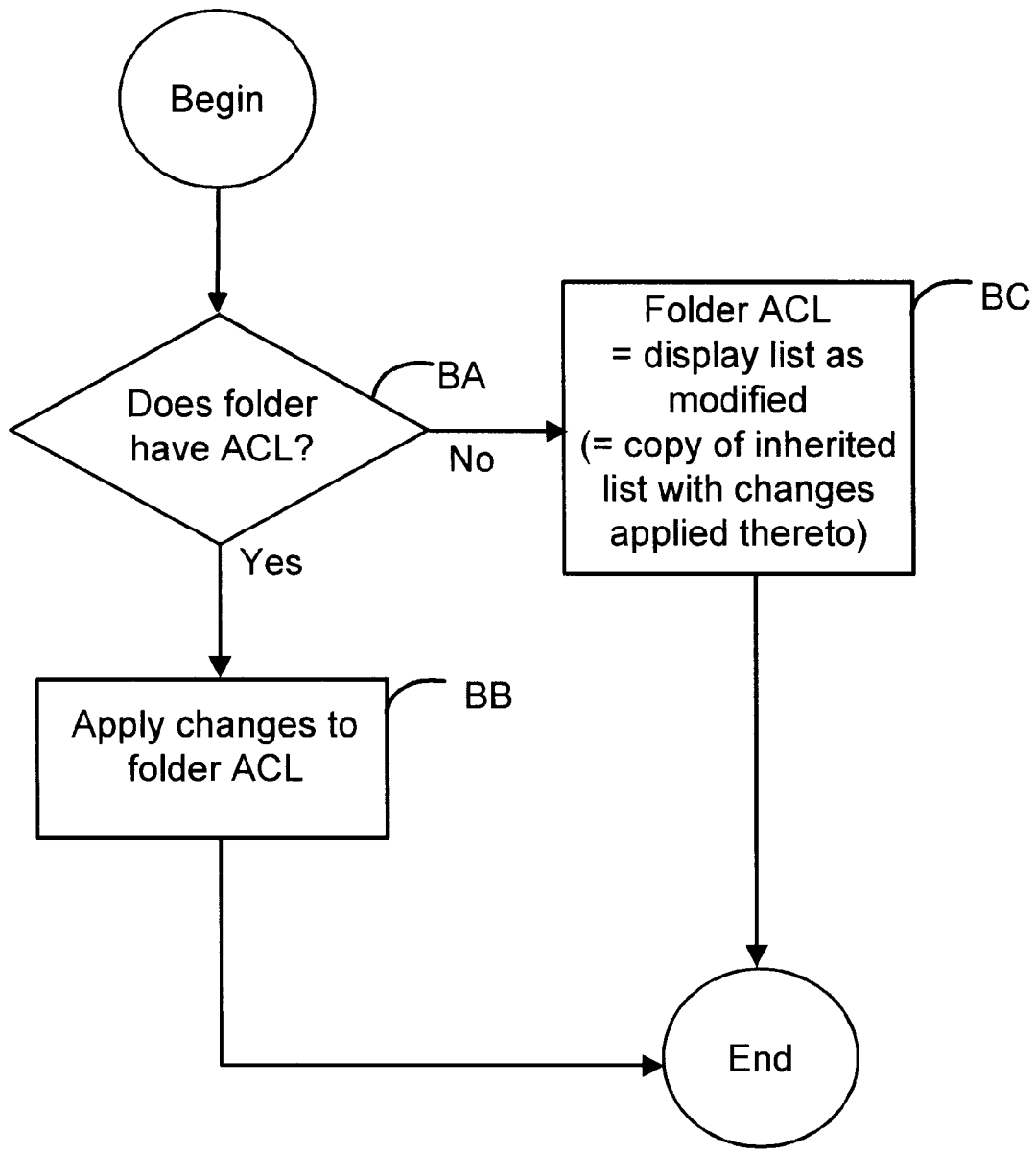
FIG. 7 is a more detailed flowchart of the steps for changing access permissions responsively to a received command.

Assuming that the list of changes is not empty, processing continues at step D of FIG. 5, whose details are shown in the flowchart of FIG. 7. Processing depends on whether the selected folder already has an ACL of its own or is inheriting from an ancestor, in which case a new ACL will be created for the folder. If the selected folder already has its own ACL (step BA), the changes made to the display list are merged with the previous contents of the ACL to form the updated ACL (step BB). Otherwise, the modified display list itself (minus any users marked as being removed, if these users are still being displayed in dialog box 600) becomes the folder's new ACL. Put another way, in the case where the folder inherits from an ancestor, a copy of the ancestor's ACL is made, the changes to the inherited ACL that were specified in dialog box 600 are applied, and the modified copy becomes the folder's new ACL.

Figure 8A:
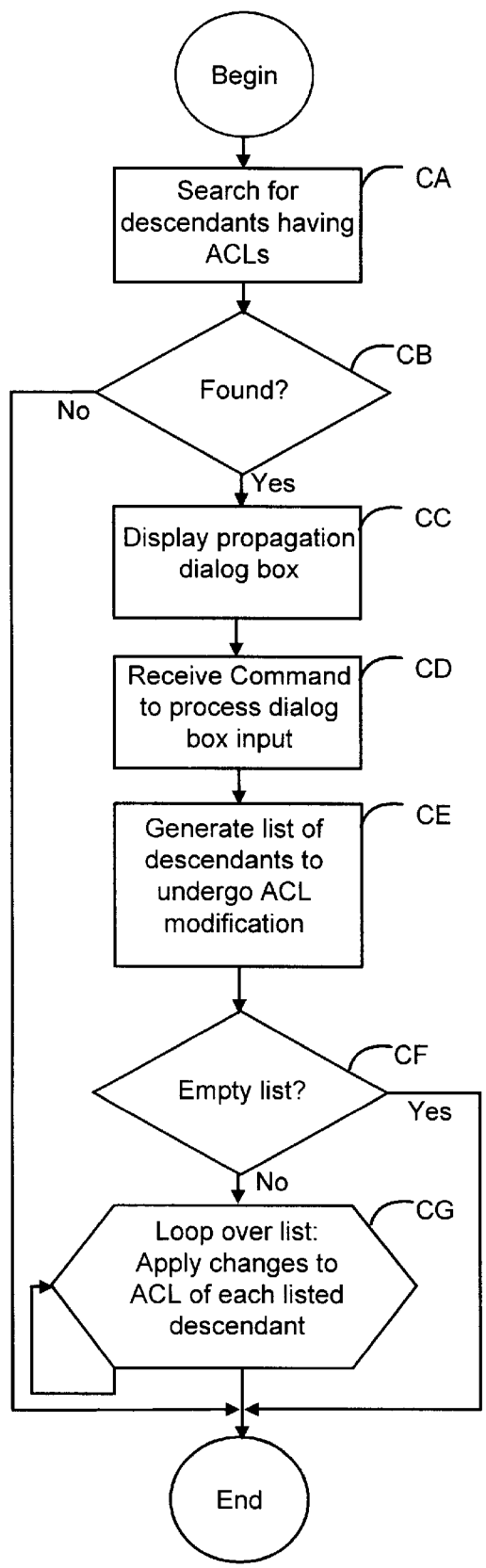
FIG. 8A is a more detailed flowchart of the steps for propagating access permission changes from a folder to its descendants in the file system hierarchy.

Once the selected resource's ACL has been created (if necessary) and updated, the changes made in dialog box 600 can be propagated to its descendants in the resource hierarchy in step E of FIG. 5, whose details are shown in the flowchart of FIG. 8A. Peer server 120 searches the resource hierarchy to determine which descendants of the selected resource, if any, have ACLs of their own (step CA). For example, if the selected resource is folder 410 in hierarchy 400, and if folder 411 has an ACL but folder 412 does not, the search returns folder 411 but not folder 412. If both folders 411 and 412 have ACLs, the search returns both folders 411 and 412. If any descendants having ACLs are found (step CB), the changes made with respect to the selected resource can be propagated to these descendants; otherwise, no propagation is performed and the remaining steps of FIG. 8A are skipped. Because changes are propagated only to those descendant folders already having ACLs, descendant folders whose access permissions have previously been specified as being different from those of the selected folder continue to have different access permissions, while descendant folders whose access permissions are inherited continue to be inherited.

Figure 8B:
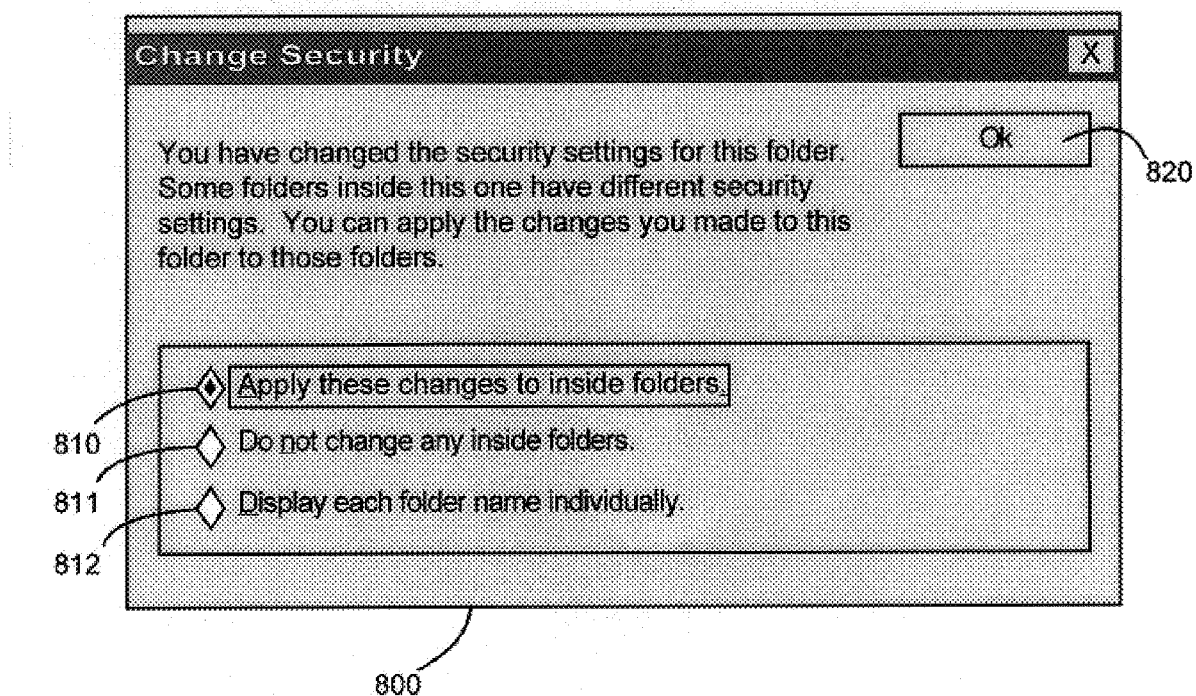
FIG. 8B is an example of a user interface dialog box for controlling the propagation of access permission changes.

If one or more descendants having ACLs were found, peer server 120 displays in user interface 125 a dialog box that can be used to control which of these descendants will be subject to the permissions changes (step CC). FIG. 8B illustrates an example of a dialog box 800 suitable for selecting descendants for propagation of changes. Dialog box 800 include buttons 810, 811, and 812, any one of which can be selected with pointing device 127. Buttons 810, 811, and 812 are used, respectively, to choose all, none, or selected ones of the descendants having ACLs for propagation. If button 812 is selected, an additional dialog box (not shown) can be displayed to permit selection of individual descendant folders. Dialog box 800 further includes a command button 820 that, when selected, issues a command that causes peer server 120 to process the selection made among in dialog box 800.

Returning to FIG. 8A, when the command button 620 is selected, peer server 120 receives a command to process the input from dialog box 800. Peer server 120 generates a list of which descendants are subject to propagation of changes (step CE). This can be all the descendants having ACLs, none of them, or a selection of them, according to which of buttons 810, 811, or 812 was selected in dialog box 800. If no descendants in the list (step CF), there is no propagation and the remaining steps of FIG. 8A are skipped. Otherwise, a loop is performed over the descendants in the list (step CG). Peer server propagates to each listed descendant in turn the changes that were made to the selected folder. More particularly, the changes made to the display list of dialog box 600 are merged with the previous contents of each descendant's ACL to form the updated ACL for that descendant.

Figure 9:
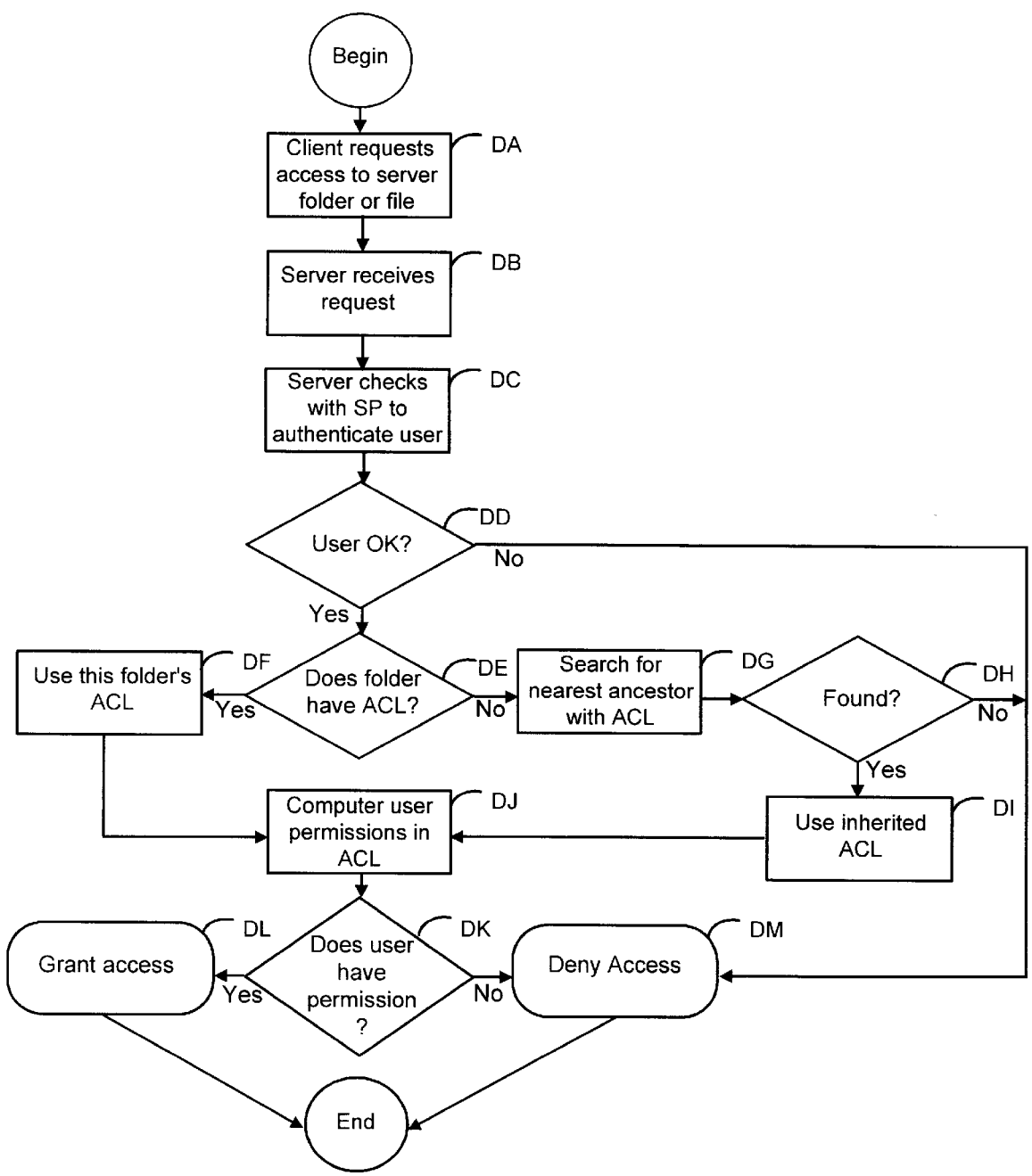
FIG. 9 is a flowchart of the steps for accessing from a client a folder having access permissions.

FIG. 9 is a flowchart of the steps for accessing from client 130 a selected folder in a resource hierarchy having associated ACLs. At the outset, a user is assumed to be logged into system 100 from client 130. Responsively to a command issued by the user, client 130 requests peer server 120 to access the folder or a file in the folder (step DA). For example, client 130 can request to open for reading or writing or otherwise access folder 410 or file 415. Peer server 120 receives this request (step DB) and, using components 165 and 168, checks with security provider 190 to authenticate the remote user, that is, to determine whether the user is a valid user of system 100 (step DC). If the user is invalid (step DD), access is denied (step DM).

If the user is valid, peer server 120 determines whether the folder has its own ACL (step DE). If so, peer server 120 uses this ACL (step DF); otherwise, peer server 120 searches the resource hierarchy (for example, hierarchy 400) to find the nearest ancestor having an ACL (step DG). If an ancestor is found (step DH), its ACL is inherited (step DI); otherwise, if no ancestor of the folder (including the root of the hierarchy) has an ACL, access is denied (step DM). Peer server 120 performs steps DE through DI using file security component 166, and performs step DM using component 165.

Once the appropriate ACL has been determined, peer server 120 uses file security component 166 in conjunction with component 168 to compute the user's permissions for the selected folder in the ACL (step DJ). If the user is not listed by name in the ACL, but the ACL contains one or more group names, a list of user groups previously stored by component 168 can be used to determine the user's group membership; if the user is not among the locally stored groups, a further check can be made with security provider 190 to see whether the user has recently been added to any groups. If the user has permission for the requested access (step DK), access is granted (step DL); otherwise, access is denied (step DM). Peer server 120 can perform step DK using either or both of components 165 and 168, and performs steps DL and DM using component 165.

The system and method of the invention are readily adaptable to use in systems, such as system 100, that contain nonhierarchical shareable resources such as printer 141. For nonhierarchical resources, no inheritance or propagation are performed. However, the user interface for setting resource permissions, in particular dialog box 600, remains substantially the same. This is a further advantage of insulating the user from the details of inheritance according to the invention.

Further Embodiments

Some further illustrative examples of specific embodiments of the invention will now be described.

The system and method of the invention are adaptable to different networking systems and their particular protocols and security models, and to hybrid networks that combine different protocols and security models. The invention provides a uniform and consistent user interface regardless of the networking system or systems being used.

As another example, the remote administration aspect of the invention wherein resource access permissions stored by the server can be modified remotely from a client node as well as locally at the server, can readily be extended to embodiments in which the permissions list is stored by yet another node of the network. In such embodiments, the user interface for manipulating and administering resource access permissions, the stored permissions themselves, the resource, and the list of users (which is stored by the security provider) can all be on different nodes of the network.

Moreover, even the resource and the server can be decoupled, as in the case of a pooled resource such as a distributed collection of printers each capable of producing the same kinds of output and each capable of being driven by any one of a distributed collection of server nodes.

Still further, the invention can be used to administer access permissions for many different kinds of resources besides file systems and printers. One such resource is a modem controlled by a dial-up server and used by off-site users to establish access to the network. Another possible resource is the registry of any computer in the network. A system administrator can be given the necessary permissions to provide remote access to the registry of any or all nodes in the system, whereas other users can be denied such access. In this example, even a node that is ordinarily considered a client can act for limited purposes as a server with respect to a resource that it controls, namely the configuration database of its registry. A registry, like a file system, can be a hierarchical resource, so that the inheritance and propagation aspects of the invention come into play in this example.

Conclusion

The foregoing specific embodiments represent just some of the ways of practicing the present invention. Many others embodiments are possible within the spirit of the invention. Accordingly, the scope of the invention is not limited to the foregoing specification, but instead is given by the appended claims along with their full range of equivalents.

We claim:

1. In a computer network having a plurality of users and comprising a server computer controlling a resource sharable by users of the network, the resource being organized as a hierarchy of elements, the hierarchy including a root element at a topmost point in the hierarchy and additional elements that are descendants of the root element in the hierarchy, a method of providing security for the resource, the method comprising the computer-implemented steps of:

receiving a request to change a protection of a first element of the hierarchy with respect to a user of the network, the first element being a specified one of the additional elements, the protection comprising an access permission for the resource;

in response to the receiving step, determining whether the first element has an associated access control list;

upon determining that the first element lacks an associated access control list, identifying a second element of the hierarchy, the second element having an associated access control list and being a proximate ancestor of the first element in the hierarchy;

after the identifying of the second element generating a copy of the access control list of the second element;

modifying the generated copy of the access control list to incorporate the requested change into the generated copy; and associating the modified copy of the access control list with the first element to establish an updated access control list associated with the first element.

2. The method of claim 1 wherein the step of receiving a request comprises receiving a request to change a protection of the first element of the hierarchy with respect to all users in a user group, the user group comprising a collection of users of the network.

3. The method of claim 1 wherein:

the step of receiving a request to change a protection of a first element of the hierarchy with respect to a user of the network comprises receiving a request to add a permission for said user to access the first element of the hierarchy; and the step of incorporating the requested change into the generated copy of the access control list comprises adding an entry to the generated copy of the access control list.

4. The method of claim 1 wherein:

the step of receiving a request to change a protection of a first element of the hierarchy with respect to a user of the network comprises receiving a request to modify a permission for said user to access the first element of the hierarchy; and the step of incorporating the requested change into the generated copy thus associated with the first element comprises modifying an entry of the access control list of the generated copy thus associated with the first element.

5. The method of claim 1 wherein:

the step of receiving a request to change a protection of a first element of the hierarchy with respect to a user of the network comprises receiving a request to remove a permission for said user to access the first element of the hierarchy; and the step of incorporating the requested change into the generated copy thus associated with the first element comprises removing an entry from the access control list of the generated copy thus associated with the first element.

6. The method of claim 1 wherein:

the step of receiving a request to change a protection of a first element of the hierarchy comprises receiving a request to remove permissions for all users of the network to access the first element of the hierarchy; and the step of incorporating the requested change into the generated copy of the access control list comprises removing all entries from the generated copy of the access control list to establish an empty access control list associated with the first element, such that no user of the network is authorized to access the first element.

7. The method of claim 1 and further comprising the step of:

propagating the requested change downwards in the hierarchy from the first element to every element of the hierarchy that is a descendant of the first element in the hierarchy and has an associated access control list by merging the requested change into the access control list of every such element.

8. The method of claim 1 and further comprising the steps of:

identifying a third element of the hierarchy, the third element having an associated access control list and being a descendant of the first element in the hierarchy; and upon identifying the third element, propagating the requested change downwards in the hierarchy from the first element to the third element by merging the requested change into the access control list of the third element.

9. The method of claim 1 wherein the computer network further comprises a client computer and a communications pathway between the client computer and the server computer, and further comprising the steps of:

issuing from the client computer a request for a user of the network to access an element of the resource;

receiving the issued request in the server computer; and responding to the issued request in a manner consistent with the updated access control list.

10. In a computer network having a plurality of users and comprising a server computer controlling a resource sharable by users of the network and a user interface for controlling access permissions for the resource, the resource being organized as a hierarchy of elements, the hierarchy including a root element at a topmost point in the hierarchy and additional elements that are descendants of the root element in the hierarchy, a method of providing security for the resource, the method comprising the computer-implemented steps of:

determining whether a first element of the hierarchy has an associated access control list, the first element being a specified one of the additional elements;

upon determining that the first element lacks an associated access control list, identifying a second element of the hierarchy, the second element having an associated access control list and being a proximate ancestor of the first element in the hierarchy;

upon identifying the second element, inheriting in the first element the access control list of the second element by generating a copy of the access control list of the second element and associating the generated copy with the first element;

displaying via the user interface permission information from a permissions list comprising a set of associations between selected users of the network and access permissions with respect to the selected users for the first element;

receiving via the user interface a command to modify the permissions list; and responsively to the received command:

initiating a request to change a protection of the first element of the hierarchy with respect to a user of the network, the protection comprising an access permission for the resource; and incorporating the requested change into the generated copy of the access control list associated with the first element to establish an updated access control list associated with the first element.

11. The method of claim 10 wherein the step of displaying permission information from a permissions list comprises displaying permission information from the generated copy of the access control list of the second element.

12. The method of claim 10 wherein the displaying step includes displaying permission information from a permissions list including an association between a user group comprising a collection of users and an access permission with respect to the users of the user group.

13. The method of claim 10 wherein the computer network further comprises a remote computer that includes the user interface and a communications pathway between the remote computer and the server computer, and wherein the initiating step comprises sending a communication between the remote computer and the server computer via the communications pathway.

14. The method of claim 10 and further comprising the steps, performed responsively to the received command, of:

identifying a third element of the hierarchy, the third element having an associated access control list and being a descendant of the first element in the hierarchy; and upon identifying the third element, propagating the requested change downwards in the hierarchy from the first element to the third element by merging the requested change into the access control list of the third element.

15. The method of claim 10 wherein the computer network further comprises a client computer and a communications pathway between the client computer and the server computer, and further comprising the steps of:

issuing from the client computer a request for a user of the network to access an element of the resource;

receiving the issued request in the server computer; and responding to the issued request in a manner consistent with the updated access control list.

16. In a computer network having a plurality of users and comprising a server computer controlling a resource sharable by users of the network, the resource being organized as a hierarchy of elements, the hierarchy including a root element at a topmost point in the hierarchy and additional elements that are descendants of the root element in the hierarchy, a method of providing security for the resource, the method comprising the computer-implemented steps of:

receiving a request to change a protection of a first element of the hierarchy with respect to a user of the network, the first element being a specified one of the additional elements, the protection comprising an access permission for the resource; p1 after the receiving of the request, associating the first element with an access control list by inheriting in the first element an access control list from an element that is a proximate ancestor of the first element in the hierarchy;

identifying a second element of the hierarchy, the second element having an associated access control list and being a descendant of the first element in the hierarchy; and upon identifying the second element, propagating the requested change downwards in the hierarchy from the first element to the second element by merging the requested change into the access control list of the second element.

17. The method of claim 16 wherein the step of receiving a request comprises receiving a request to change a protection of the first element with respect to all users in a user group, the user group comprising a collection of users of the network.

18. The method of claim 16 wherein the computer network further comprises a client computer and a communications pathway between the client computer and the server computer, and further comprising the steps of:

issuing from the client computer a request for a user of the network to access an element of the resource;

receiving the issued request in the server computer; and responding to the issued request in a manner consistent with the propagated requested change.

19. In a computer network providing a shareable resource comprising components and having a first set of access permissions for a first component of the resource, a method of controlling access to the resource, the method comprising the computer-implemented steps of:

designating a second component of the resource for which no set of access permissions has been established;

making a copy of the first set of access permissions;

generating a second set of access permissions by modifying the copy of the first set of access permissions;

associating the second set of access permissions with the second component of the resource; and merging the second set of access permissions with a third set of access permissions for a third component of the resource.

20. The method of claim 19 wherein components of the resource are organized in a hierarchy, wherein the designating step comprises designating a second component that is a descendant of the first component in the hierarchy, and wherein the merging step comprises merging the second set of access permissions with a third set of access permissions for a third component of the resource that is a descendant of the second component in the hierarchy.

21. A computer network system for use by a plurality of users, comprising:

a shareable resource comprising a hierarchy of elements;

a server computer mediating user access to the resource;

a client computer;

communications means for operatively coupling the client computer to the server computer;

resource protection means for controlling user access permissions for the resource;

means for designating an element of the hierarchy;

means for indicating a set of user access permissions for the designated element;

means for conveying a request to the resource protection means, the request communicating the designated element and the indicated set of user access permissions for the designated element to the server computer; and means for responding to the conveyed request, comprising:

means for locating an established set of user access permissions, the established set most preferentially being associated with the designated element, the established set less preferentially being associated with a nearest ancestor element located above the designated element in the hierarchy;

means for generating a modified version of the established set responsively to the indicated set of user access permissions; and means for associating the modified version of the established set with the designated element to establish a new set of access permissions for the designated element.

22. The system of claim 21 and further comprising:

means for accessing the resource from the client computer consistently with the new set of access permissions established for the designated element.

23. The system of claim 21 wherein the means for responding to the conveyed request further comprises:

means for locating an additional established set of user access permissions, the additional established set being associated with a selected element that is a descendant of the designated element in the hierarchy;

means for modifying the additional established set responsively to the indicated set of user access permissions by merging modifications in the modified version of the established set into the additional established set; and means for associating the modified additional established set with the selected element to establish a new set of access permissions for the selected element.

24. The system of claim 21 wherein the shareable resource comprises a hierarchical file system.

25. The system of claim 24 wherein the hierarchical file system comprises files and folders, and the designated element comprises a folder.

26. The system of claim 24 wherein the shareable resource includes a configuration database.

27. The system of claim 21 and further comprising an additional shareable resource.

28. The system of claim 27 wherein the additional shareable resource includes a printer.

29. The system of claim 27 wherein the additional shareable resource includes a modem.

30. The method of claim 10 wherein the receiving step includes the step of receiving via the user interface a command to add to the permissions list an association between a user not displayed in the displaying step and access permissions with respect to that user.

31. The method of claim 10 wherein the receiving step includes the step of receiving via the user interface a command to modify access permissions associated with an identified user, the command generated in response to receiving from the user interface a command to identify the user.

32. The method of claim 10 wherein the receiving step includes the step of receiving via the user interface a command to delete an association between an identified user and access permissions with respect to the identified user generated in response to receiving via the user interface a command to identify the identified user.

33. In a computer network having a plurality of users and comprising a server computer controlling a resource sharable by users of the network and a user interface for controlling access permissions for the resource, the resource being organized as a hierarchy of elements, the hierarchy including a root element at a topmost point in the hierarchy and additional elements that are descendants of the root element in the hierarchy, a method of providing security for the resource, the method comprising the computer-implemented steps of:

determining whether a first element of the hierarchy has an associated access control list, the first element being a specified one of the additional elements;

upon determining that the first element lacks an associated access control list, identifying a second element of the hierarchy, the second element having an associated access control list and being a proximate ancestor of the first element in the hierarchy;

upon identifying the second element, inheriting in the first element the access control list of the second element by generating a copy of the access control list of the second element and associating the generated copy with the first element;

displaying via the user interface permission information from a permissions list comprising a set of associations between selected users of the network and access permissions with respect to the selected users for the first element;

receiving via the user interface a command to modify the permissions list;

responsively to the received command:
  initiating a request to change a protection of the first element of the hierarchy with respect to a user of the network, the protection comprising an access permission for the resource;

incorporating the requested change into the generated copy associated with the first element to establish an updated access control list associated with the first element;

in response to the step of receiving a command identifying a third element of the hierarchy, the third element having an associated access control list and being a descendant of the first element in the hierarchy;

upon identifying the third element, propagating the requested change downwards in the hierarchy from the first element to the third element by merging the requested change into the access control list of the third element;

displaying via the user interface a prompt enabling a user of the user interface to select whether the requested change should be propagated downward in the hierarchy from the first element; and receiving via the user interface a selection that the requested change should be propagated downward in the hierarchy from the first element, and wherein the propagating step is performed in response to a step of receiving a selection that the requested change should be propagated downward in the hierarchy from the first element.

34. An article of computer-readable media having contents that cause a computer network having a plurality of users and comprising a server computer controlling a resource sharable by users of the network, the resource being organized as a hierarchy of elements, the hierarchy including a root element at a topmost point in the hierarchy and additional elements that are descendants of the root element in the hierarchy, to provide security for the resource by performing the computer-implemented steps of:

receiving a request to change a protection of a first element of the hierarchy with respect to a user of the network, the first element being a specified one of the additional elements, the protection comprising an access permission for the resource;

determining whether the first element has an associated access control list;

upon determining that the first element lacks an associated access control list, identifying a second element of the hierarchy, the second element having an associated access control list and being a proximate ancestor of the first element in the hierarchy;

upon identifying the second element, inheriting in the first element the access control list of the second element by generating a copy of the access control list of the second element and associating the generated copy with the first element; and incorporating the requested change into the generated copy thus associated with the first element to establish an updated access control list associated with the first element.

35. A computer-readable medium whose contents cause a computer network to provide security for a resource, the computer network having a plurality of users and comprising a server computer controlling a resource sharable by users of the network and a user interface for controlling access permissions for the resource, the resource being organized as a hierarchy of elements, the hierarchy including a root element at a topmost point in the hierarchy and additional elements that are descendants of the root element in the hierarchy, by performing the steps of:

determining whether a first element of the hierarchy has an associated access control list, the first element being a specified one of the additional elements;

upon determining that the first element lacks an associated access control list, identifying a second element of the hierarchy, the second element having an associated access control list and being a proximate ancestor of the first element in the hierarchy;

upon identifying the second element, inheriting in the first element the access control list of the second element by generating a copy of the access control list of the second element and associating the generated copy with the first element;

displaying via the user interface permission information from a permissions list comprising a set of associations between selected users of the network and access permissions with respect to the selected users for the first element;

receiving via the user interface a command to modify the permissions list;

responsively to the received command:
    initiating a request to change a protection of the first element of the hierarchy with respect to a user of the network, the protection comprising an access permission for the resource;

incorporating the requested change into the generated copy associated with the first element to establish an updated access control list associated with the first element;

in response to the step of receiving a command identifying a third element of the hierarchy, the third element having an associated access control list and being a descendant of the first element in the hierarchy;

upon identifying the third element, propagating the requested change downwards in the hierarchy from the first element to the third element by merging the requested change into the access control list of the third element;

displaying via the user interface a prompt enabling a user of the user interface to select whether the requested change should be propagated downward in the hierarchy from the first element; and receiving via the user interface a selection that the requested change should be propagated downward in the hierarchy from the first element, and wherein the propagating step is performed in response to a step of receiving a selection that the requested change should be propagated downward in the hierarchy from the first element.

* * * * *